Figure 1:
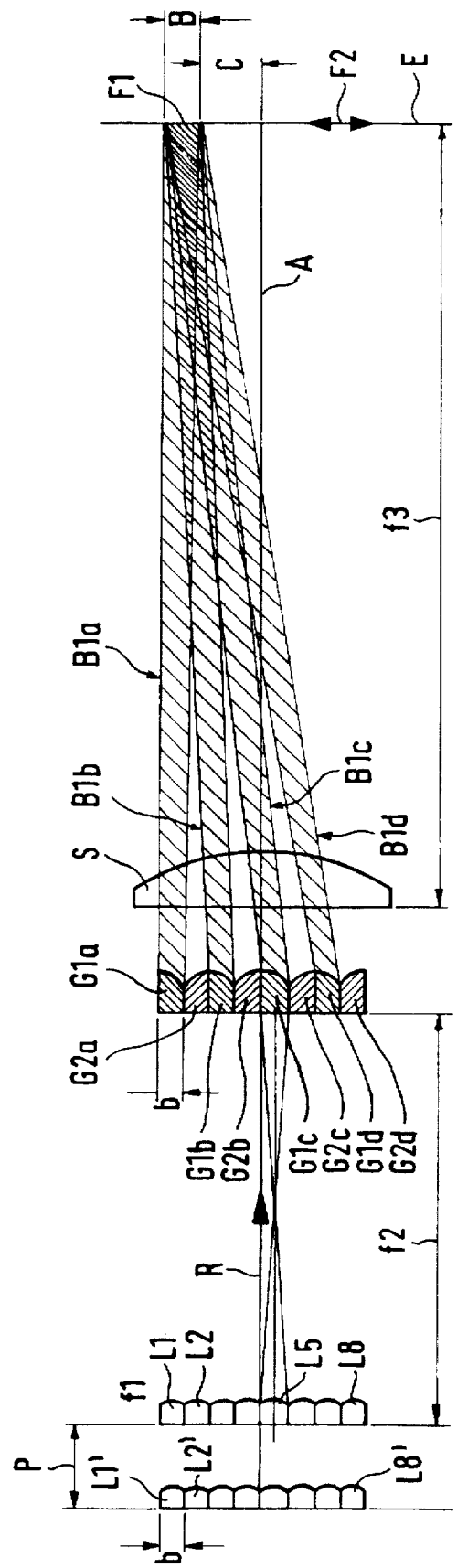

United States Patent [19]
Kahlert et al.

[11] Patent Number: 5,796,521
[45] Date of Patent: Aug. 18, 1998

[54] OPTICAL APPARATUS FOR THE HOMOGENIZATION OF LASER RADIATION AND THE GENERATION OF SEVERAL LIGHTING FIELDS

[75] Inventors: Hans-Jürgen Kahlert, Göttingen; Berthold Burghardt, Waake, both of Germany

[73] Assignee: Microlas Lasersystm GmbH, Gottingen, Germany

[21] Appl. No.: 895,755

[22] Filed: Jul. 17, 1997

[30] Foreign Application Priority Data

Aug. 12, 1996 [DE] Germany ............... 196 32 460.2

[51] Int. Cl.$^6$ ............................................. G02B 27/10
[52] U.S. Cl. ..................... 359/619; 359/621; 359/625
[58] Field of Search ........................ 359/619, 621, 359/625, 626, 628; 362/259, 268

[56] References Cited

U.S. PATENT DOCUMENTS 3,580,661  5/1971  Cooper, Jr. .................. 359/457
4,185,891  1/1980  Kaestner ...................... 359/619
5,319,496  6/1994  Jewell et al. ................. 359/741
5,414,559  5/1995  Burghardt et al. ........... 359/619

FOREIGN PATENT DOCUMENTS 42 20 705 A1  1/1994  Germany.

Primary Examiner—Georgia Y. Epps
Assistant Examiner—Ricky Mack
Attorney, Agent, or Firm—Limbach & Limbach L.L.P.

[57] ABSTRACT

An optical apparatus for the homogenization of laser radiation, in particular of an excimer laser, and for the generation of several lighting fields (F1, F2) from this radiation comprises a plurality of acentric lens segments (G1a, G1b, G1c, G1d; G2a, G2b, G2c, G2d). The acentric lens segments are characterized in that they are segments of cylindrical lenses with an axis of symmetry and that the portion of the cylindrical lens which contains the axis of symmetry is not part of the acentric lens segment. Several groups (G1, G2) of acentric cylindrical lens segments are provided, with each group generating a lighting field (F1, F2) of homogeneous energy density. A collecting lens (S) is arranged downstream of the acentric lens segments, which generates the lighting fields (F1, F2) on a work plane (E).

6 Claims, 2 Drawing Sheets

OPTICAL APPARATUS FOR THE HOMOGENIZATION OF LASER RADIATION AND THE GENERATION OF SEVERAL LIGHTING FIELDS

The invention relates to an optical apparatus for the homogenisation of laser radiation and the generation of several lighting fields by means of a plurality of lenses which are arranged in a row perpendicular to the beam axis and a collecting lens which is arranged downstream in the direction of radiation.

Such an apparatus is known from DE 42 20 705 Al. Therein, a laser beam is divided into two lighting fields and homogenized. A plurality of lenses is arranged in a row perpendicular to the optical axis, and these lenses each have a prismshaped form on their radiation output side. A collecting lens is arranged downstream of these, by means of which the two homogenized lighting fields are imaged at a distance on a working plane.

The present invention is based on the object to further develop an optical apparatus of said type in such a manner that the possibility is provided to simultaneously generate more than two lighting fields with homogeneous energy density distribution without any detrimental effect upon energy density, resolution, frame size and geometry.

According to the invention, this object is achieved in that the lens row comprises several different groups of acentric lens segments.

According to a preferred embodiment of the invention, the lens segments are curved convexly on their radiation output side.

Another preferred embodiment of the invention provides for the same structure of the lens segments of one group each and for their identical orientation.

Still another preferred embodiment provides for a row of centric lenses which are arranged in the direction of radiation upstream of the acentric lens segments. In order to adjust the field size, the row of centric lenses is capable of being displaced along the optical axis of the system according to another preferred embodiment.

Yet another preferred embodiment provides for the individual lens segments and the centric lenses to each have the same optically effective width.

Figure 2:
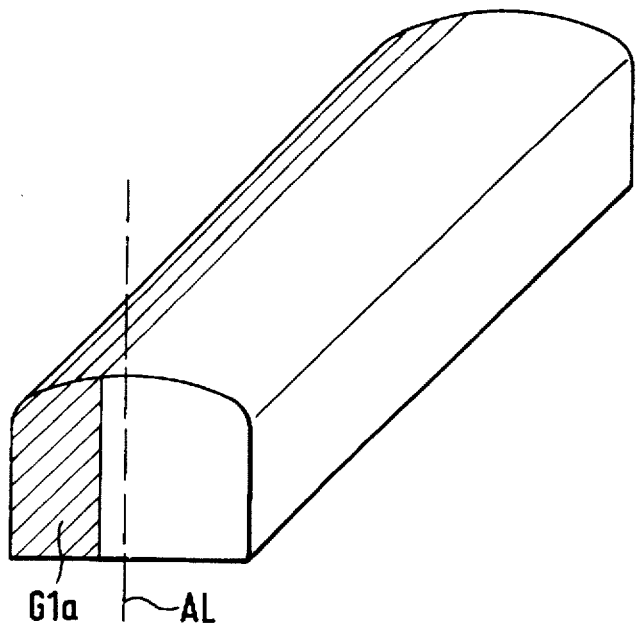
Figure 3:
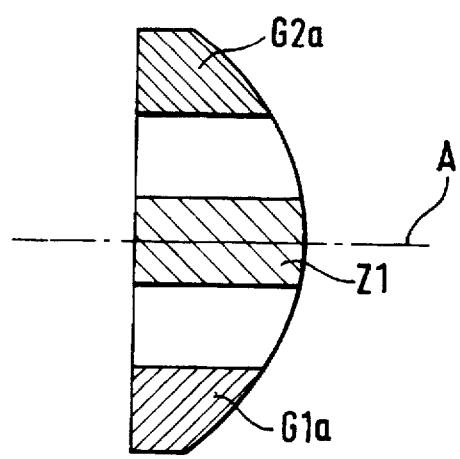

In the following, an embodiment of the invention will be described in more detail with reference to the drawings; in which:

FIG. 1 schematically shows an optical apparatus for the homogenisation of laser radiation and for the generation of several lighting fields;

FIG. 2 schematically shows the manufacture and the structure of an acentric lens segment;

FIG. 3 schematically shows embodiments of possible acentric and centric lens segments.

The optical apparatus shown in FIG. 1 serves to homogenize the output radiation of an excimer laser, in particular, and to also generate several, in particular more than two, lighting fields.

Excimer lasers emit a radiation with a generally rectangular cross-section. In the direction of the so-called short axis (of the rectangle) the energy density of the radiation has a distribution which essentially corresponds to a so-called Gaussian distribution. In the direction of the long axis, the distribution of the energy density has an essentially trapezoidal shape with steep flanks ("flat top"). For a plurality of applications, the beam emitted by the excimer laser must be homogenized as completely as possible, i.e. the energy density of the radiation applied to a substrate per surface unit is to be as uniform as possible over the entire work range.

FIG. 1 illustrates an optical apparatus by means of which the radiation of an excimer laser is simultaneously homogenized and divided into several lighting fields, in particular in the direction of the short axis (along which the energy density follows a Gaussian distribution). Such a division into several lighting fields is desired for a plurality of excimer laser applications whenever processing by means of laser radiation is to be carried out, for example, at different places of a substrate (workpiece) simultaneously.

In FIG. 1, the substrate plane E is shown on the right hand side. In this plane, several lighting fields F1, F2 and, if required, further lighting fields with high contour sharpness and homogeneity of the energy density within the fields are to be generated.

The laser radiation thus enters the apparatus according to FIG. 1 and thereby passes a first row of lenses L1, L2 the focal length of each amounting to f1. In FIG. 1 two lens rows are illustrated in order to demonstrate that the lens row L1, L2, ..., L8 can be displaced along the optical axis A of the apparatus. In this embodiment, actually only one lens row L1, L2, ..., L8 is provided, with the lenses being displaceable in the direction of the arrow P into the position L1', L2', L8'. As a result of the displacement in the direction of the arrow P, the field size B can be altered.

Another lens row G1a, G1b, G1c, G1d; G2a, G2b, G2c, G2d is arranged in the direction of the beam and downstream of the lens row L1, L2, ..., L8. As is schematically indicated by lenses L5 and G1c in FIG. 1, each centric lens L1, L8 is associated with an acentric lens G1a, ..., G2d. The optically effective widths b of both lens types are identical.

Each of the lenses L1, ..., L8 and G1a, ..., G2d are cylindrical lenses with the longitudinal cylinder axes being perpendicular to the drawing plane of FIG. 1. In an excimer laser beam with rectangular cross-section and Gaussian distribution of the energy density in the direction of the short axis, the arrangement according to FIG. 1 causes, for example, a homogenisation and division of the laser radiation into different lighting fields F1, F2 or in the direction of the short axis, respectively. The optics with respect to the other, long axis of the excimer radiation is in a manner known per se anamorphotic and can, for example, be selected in a similar manner to the optics according to FIG. 1. It is, however, also possible to realize the optics with respect to the long axis (here not shown in detail) differently—e.g. without homogenisation.

FIGS. 2 and 3 show the acentric lens segments by way of example. FIG. 2 shows how, e.g. the acentric lens segment G1a is formed from an centric cylindrical block. The term "acentric" means that a segment of a lens with axis of symmetry or plane of symmetry, respectively, AL is formed, whereby a centric lens section which contains the axis or plane, respectively, of symmetry AL does not belong to the "acentric lens segment". By way of an example, FIG. 2 shows perspectively (three-dimensionally) the acentric lens segment G1a which can be obtained by "cutting" it off the illustrated cylindrical block. The acentric lens segment G1a is identified by hatching in FIG. 2.

FIG. 3 is a sectional view perpendicular to the longitudinal cylinder axis AL of two acentric lens segments G1a and G2a which can be employed in the optics according to FIG. 1. FIG. 3 also shows a centric lens segment Z1 which according to the above definition is not "acentric" in the sense of this invention. Centric lens segments corresponding to the segment Z1 of FIG. 3 can be employed in the optics according to FIG. 1 in addition to the acentric lens segments. According to FIG. 1 the row of acentric lens segments, which is arranged perpendicularly to the optical axis A, comprises two different groups, i.e. a first group G1 and a second group G2. The acentric lens segments of the first group G1 are identified by G1a, G1b, G1c and G1d and the acentric lens segments of the second group G2 are identified by G2a, G2b, G2c und G2d. FIG. 1 shows in more detail only the imaging by the first group G1 of acentric lens segments which generate the lighting field F1 by superposition. For this purpose, a collecting lens S is arranged downstream of the row of acentric lens segments, through which beams B1a, B1b, B1c and B1d of all acentric lens segments of one group G1 are imaged such that they are superposed onto a single lighting field F1. Hence, the work surface E of a substrate to be processed is arranged at the distance F3 of the focal length of the collecting lens S and the radiation is imaged sharply onto the lighting fields F1 etc. As can be seen from FIG. 1, radiation from all areas of the laser cross-section is imaged through the acentric lens segments of the group G1 onto the lighting field F1, whereby the homogenisation of the radiation is achieved.

Similarly, the acentric lens segments G2a, . . . , G2d of the second group G2 generate an additional lighting field F2 at the other side of the optical axis, these beam paths not being shown again in FIG. 1. The lighting fields F1 and F2 each have a distance C from the optical axis A.

The focal length of the acentric lens segments G1a, . . . , G2d is taken to be F2. Thus, in the preferred embodiment, the distance of the first row of centric cylindrical lenses from the row of acentric lens segments will then be F2.

The embodiment according to FIG. 1 comprises only two groups G1 and G2 of acentric lens segments so that only two lighting fields F1, F2 are generated by one group each. In the illustrated embodiment, each group comprises four acentric cylindrical lens segments. The homogenisation effect can, if desired, be enhanced in that more than four elements are provided for one group. If more than two lighting fields are desired, another group (not shown) of acentric cylindrical lens segments can be added, with the lens segments of this additional (third) group each being arranged between two segments of the first two groups, i.e., for example, the first acentric cylindrical lens segment of the third group (not shown) between the segments G1a and G2a, etc. The cylindrical lens segments of this third group would then generate another separate lighting field (not shown). Depending on the desired number of lighting fields, additional groups of acentric cylindrical lens segments can be added accordingly.

In the embodiment according to FIG. 1 the acentric lens segments of each group are of identical geometrical structure each with the same spatial orientation, i.e. the individual lens segments of one group can be shifted by translation in one direction to coincide with each other. It is also possible to provide cylindrical lens segments of different geometry in one group, but this can result in a reduced homogenisation in the lighting field generated by this group.

In the illustrated embodiment, the individual acentric lens segments (and correspondingly the centric lens segments L1, L2, . . . , L8, too) are not spaced from one another, i.e. they form a continuous row. This results in an optimum radiant efficiency. It is, however, also possible to provide gaps between the lens segments.

If, as a modification of the illustrated embodiment, a lighting field is to be created on the optical axis A, too, then in addition to the shown acentric lens segments still another group (not shown) of centric lens segments can be included between the acentric lens segments in the manner described above, i.e. for example centric lens segments Z1 according to FIG. 3.

We claim:

1. An optical apparatus for the homogenization of a beam of radiation and the generation of several lighting fields (F1, F2), comprising a plurality of lenses (G1a, G1b, G1c, G1d; G2a, G2b, G2c, G2d) which are arranged in a row perpendicular to the beam axis (A) and a collecting lens (S) which is arranged downstream in the direction of radiation (R), characterized in that the lens row comprises several different groups (G1, G2) of acentric lens segments (G1a, . . . , G1d; G2a, . . . , G2d).

2. The optical apparatus according to claim 1, characterized in that the lens segments (G1a, G1b, G1c, G1d; G2a, G2b, G2c, G2d) are of a convex shape at their radiation output side.

3. The optical apparatus according to claim 1, characterized in that each of the lens segments (G1a, G1b, G1c, G1d) of one group (G1) has the same structure and orientation.

4. The optical apparatus according to claim 1, characterized in that a row of centric lenses (L1, L2, . . . , L8) is arranged upstream of the acentric lens segments (G1a, G1b, G1c, G1d; G2a, G2b, G2c, G2d) in the direction of the radiation (R).

5. The optical apparatus according to claim 4, characterized in that the individual lens segments (G1a, G2d) and the centric lenses (L1, . . . , LB) each have the same optically effective width (b).

6. The optical apparatus according to claim 4, characterized in that the row of centric lenses (L1, . . . , L8) is displaceable in the direction of the optical axis (A).

* * * * *